United States Patent [19]

Voit

[11] Patent Number: 5,078,887
[45] Date of Patent: Jan. 7, 1992

[54] REMOVAL OF IRON CONTAMINANT FROM ZIRCONIUM CHLORIDE SOLUTION

[75] Inventor: Donald O. Voit, Ogden, Utah
[73] Assignee: Westinghouse Electric Corp., Pittsburgh, Pa.
[21] Appl. No.: 606,636
[22] Filed: Oct. 31, 1990
[51] Int. Cl.$^5$ .............................................. B01D 11/04
[52] U.S. Cl. ........................................ 210/634; 423/70
[58] Field of Search ............................ 423/70, 73, 84; 204/130; 210/634, 673

[56]  References Cited
U.S. PATENT DOCUMENTS 3,658,466  4/1972  Otsuka ................................... 23/22

Primary Examiner—Frank Spear
Attorney, Agent, or Firm—J. C. Valentine

[57]  ABSTRACT

The processing of an aqueous zirconium chloride solution contaminated with iron, typically iron chloride (FeCl$_3$), for removing the iron is improved by flowing a suitable solvent, such as methyl isobutyl ketone (MIBK) solution, countercurrent to the flow of the zirconium chloride solution at preferably a ratio of about 0.1 to about 0.25 in a solvent extraction column of from ten to fifteen theoretical stages, preferably a pulse column, and by recovering the solvent for recycling free of iron by distillation of the iron-loaded solvent in a packed, steam-stripper, distillation column to save energy and to avoid problems created by tar formation in the conventional solvent extraction system normally used.

10 Claims, 2 Drawing Sheets

REMOVAL OF IRON CONTAMINANT FROM ZIRCONIUM CHLORIDE SOLUTION

BACKGROUND OF THE INVENTION

1. Field of the Invention

The invention relates to solvent extraction systems that operate on aqueous feed solutions of zirconium chloride to remove iron contaminants.

2. Description of the Prior Art

Zirconium and hafnium metals are conventionally obtained by complicated chemical processing of zircon sand involving initial chlorination of the sand to produce mixed zirconium/hafnium chlorides, which are separated by liquid-liquid extraction techniques in a solvent extraction plant.

Following seaparation of the chlorides, the production of nuclear grade zirconium metal requires the extraction of iron contaminant from the zirconium chloride solution that comes from the solvent extraction circuit. This is normally carried out by passing such zirconium cholride solution as normally contaminated with $FeCl_3$, to the top of a packed iron-removal column (having two or three theoretical stages) for countercurrent flow relative to methyl isobutyl ketone (MIBK) as an extraction solvent that is fed into the column adjacent to its bottom. The ferric chloride is extracted into the MIBK, which exits the column adjacent to its top. The iron-free $ZrOCl_2$ solution exists the column adjacent to its bottom. The iron-loaded MIBK solution is stripped of the iron contaminant by countercurrent contact with water, normally carried out in a second, packed, iron-wash column.

In this conventional procedure, water containing the $FeCl_3$ is saturated with MIBK as it leaves the iron-wash column. The MIBK content is recovered from the water by steam that normally flows countercurrent to the water in a packed, steam-stripper column. The MIBK is separated from steam condensate by decantation and the water is used in the iron-wash column.

In addition to this iron extraction system, the solvent extraction plant utilizes a still for purifying the MIBK circulating in the main Zr/Hf separation system, which becomes contaminated with tar-like substances. Typically, about 5% of the total MIBK solvent flow is continually removed and distilled. The MIBK is recovered as an overhead product. The tars accumulate in the bottom of the still and are periodically tapped for disposal as a hazardous waste. The iron-free MIBK from the iron extraction system is passed into the still for further purification before being reused.

BRIEF SUMMARY OF THE INVENTION

In accordance with the invention, the conventional systems of the solvent extraction plant are modified and several advantages achieved.

By using an iron extraction column (preferably in the form of a pulse column) having from ten to fifteen theoretical stages, the MIBK to $ZrOCl_2$ feed solution flow ratio is reduced very considerably, e.g. from 0.5 to 1 to from about 0.1 to about 0.25, and the effluent MIBK requires no washing. The usual iron wash column is eliminated. Moreover, $FeCl_3$/MIBK distillation and main plant MIBK solvent distillation are carried out in a steam distillation column in which tar formation are removal are not problems. Iron-loaded MIBK exits the iron extraction column and feeds the steam distillation column, within which th MIBK is vaporized by the steam, leaving the $FeCl_3$ dissolved in an aqueous stream flowing downwardly in the distillation column. Such stream carries all other non-volatile matter, such as the organic compounds that form tars in the usual still, and passes out of such distillation column to be disposed of with other process waste resulting from conventional procedures. No hazardous waste tars are produced and the labor-intensive step of tapping tars from a still is eliminated. Moreover, energy requirements are reduced, since the energy required to steam-strip the ferric cholride stream does not exceed that required by the usual MIBK still that has been eliminated.

DESCRIPTION OF THE DRAWING

In the accompanying drawing which shows the best mode presently contemplated of carrying out the invention in actual practice.

DETAILED DESCRIPTION OF THE ILLUSTRATED EMBODIMENT

Figure 1:
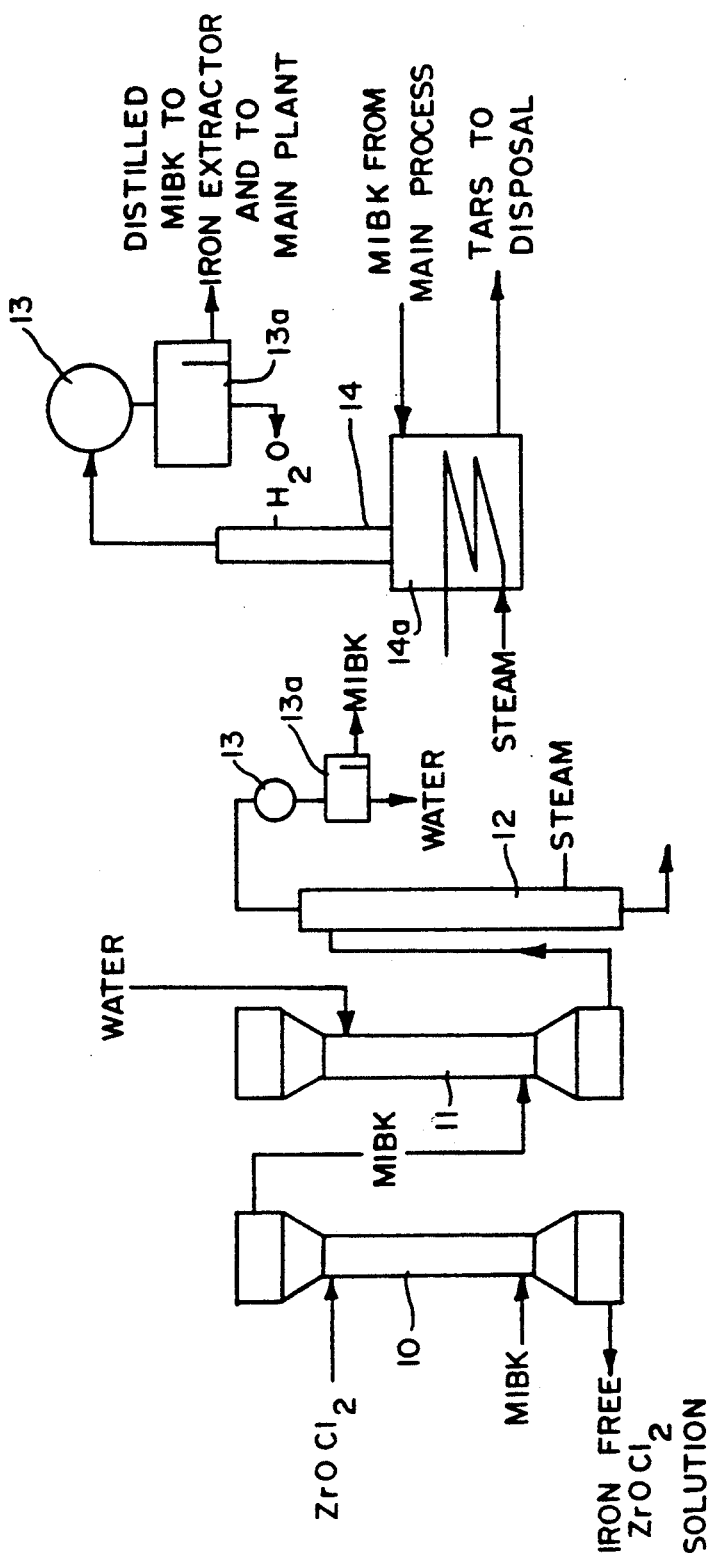
FIG. 1 is a schematic presentation of the conventional process and equipment of the prior art.

The process and equipment of FIG. 1 is as previously described under the heading "Description of the Prior Art". This is to make clear the modifications and advantages of the invention.

Thus, in the process and apparatus of the prior art, the feed $ZrOCl_2$ solution introduced into the top of the usual, packed, iron-removal column 10, having two or three theoretical stages, flows downwardly in the column countercurrent to the flow of MIBK solvent introduced near the bottom of the column. The resulting iron free $ZrOCl_2$ solution exits at the bottom of the column.

The now iron-loaded MIBK solvent exits at the top of column 10 and is passed to a lower part of a normal iron-wash column 11, within which it flows upwardly countercurrent to a downward flow of water introduced near the top of the column. The resulting MIBK-saturated water, carrying the $FeCl_3$, is passed from the bottom of column 11 to the upper part of a steam-stripper column 12, within which steam introduced near the bottom of such column vaporizes the MIBK solvent and carries it out of the top of the column into a condenser 13 where total condensation enables decantation of the MIBK from the separation chamber 13a separate from the water resulting from condensation of the steam. The water is normally recycled to iron-wash column 11 while the MIBK condensate is passed to the main plant from ammonia regeneration As part of the overall plant, there is a still 14 equipped at 14a for steam heating, into which is passed contaminated MIBK solvent from the main system. Here, the MIBK is vaporized and collected as a condensate in purified form for recycling in the process.

Figure 2:
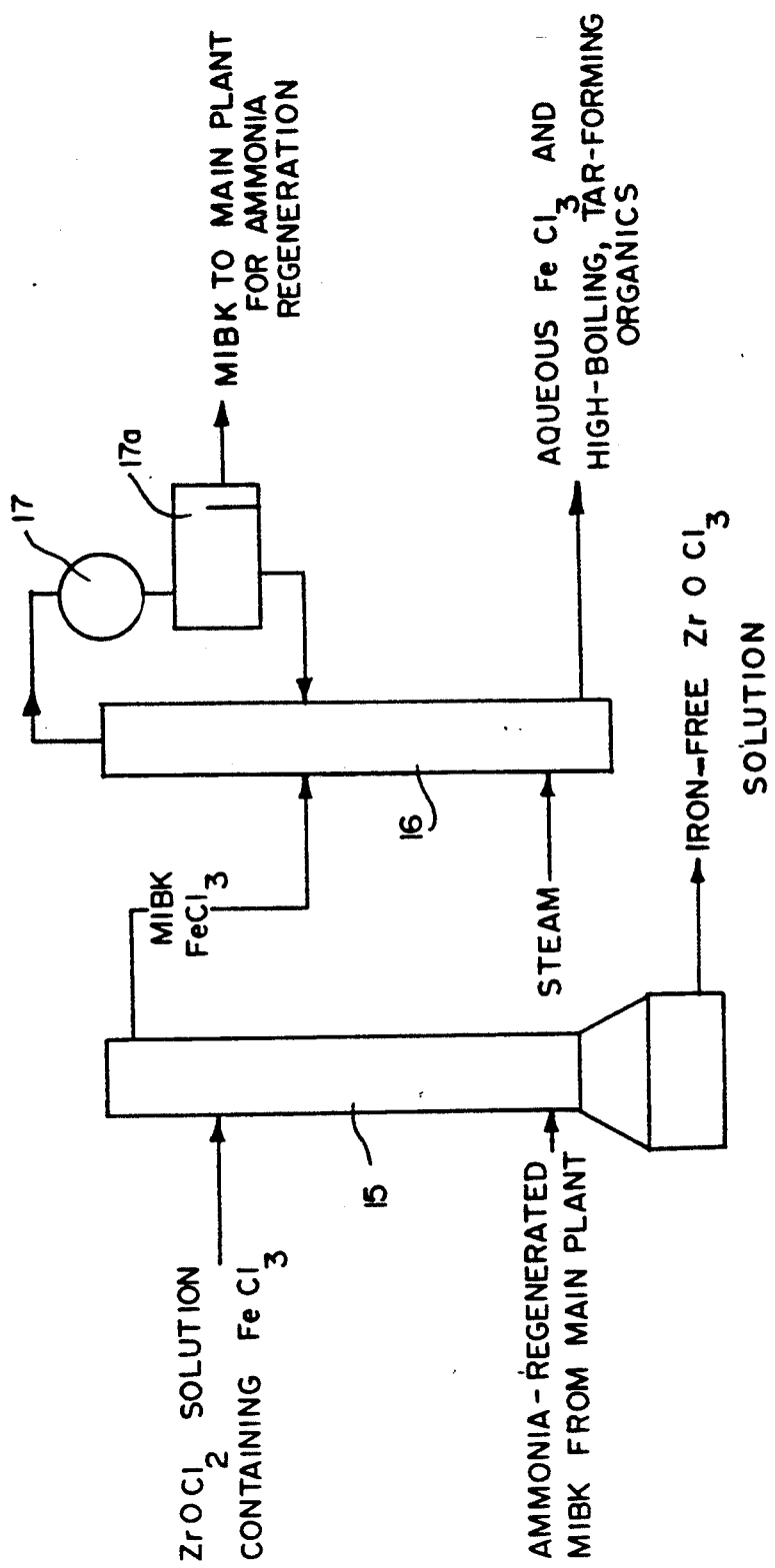
FIG. 2, a similar schematic presentation of the process and equipment of the invention.

In accordance with the invention as shown in FIG. 2, this prior art plant is modified by elimination of both the iron-wash column 11 and the still 14. Column 10 is replaced by an extraction column having ten to fifteen theoretical stages, usually a pulse column 15, into the upper part of which is introduced the iron-contaminated $ZrOCl_2$ solution and into the lowre part of which is introduced ammonia-regenerated MIBK solvent from the main plant.

Iron-loaded MIBK solvent from the upper part of column 15 is passed into the upper part of a packed, steam stripper distillation column 16, into the lower part of which steam is introduced to vaporize the MIBK solvent. A residual aqueous solution, containing steam condensate, the FeCl₃, and high-boiling, tar-forming organics, as well as non-volatile solids, flows downwardly through the column and is discharged at or near the bottom thereof as a non-hazardous stream to join other process waste from the plant for disposal in the usual way.

Some steam and vaporized MIBK are passed out of the top of the column 16 into a condenser 17 for total condensation, as in the conventional equipment of FIG. 1, the MIBK condensate being decanted from a separation chamber 17a and passed to the main plant for ammonia regeneration prior to recycling. The water resulting from condensation of the steam is advantageously recycled to the upper part of column 16.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim as my invention:

1. A process for eliminating iron contaminant from an aqueous zirconium chloride solution that has been contaminated with FeCl₃ in a plant in which zirconium and hafnium chloride solutions are separated by a main MIBK solvent extraction system and the FeCl₃ is normally removed from the zirconium chloride solution by a secondary MIBK solvent extraction system, said process comprising the steps of removing the FeCl₃ from the zirconium chloride solution by flowing regenerated MIBK contaminated with tar-forming organic compounds from said main solvent extraction system as an extraction solvent and said zirconium chloride solution countercurrently through a solvent extraction column of from ten to fifteen theoretical stages of a flow ratio of about 0.1 to about 0.25, respectively; discharging the iron-free zirconium chloride solution from said column; passing the said contaminated FeCl₃-loaded MIBK solvent directly to a packed, steam-stripper, distillation column; vaporizing the MIBK solvent in said distillation column, resulting in a residual aqueous solution containing the FeCl₃ and tar-forming organic compounds; separately discharging the vaporized MIBK solvent and said residual aqueous solution from said distillation column; and condensing said vaporized MIBK solvent and returning it to said main solvent extraction system substantially free of said tar-forming organic compounds.

2. A process for eliminating iron contaminant from an aqueous zirconium chloride solution that has been contaminated with iron in a plant in which zirconium and hafnium chloride solutions are separated by a main solvent extraction system and the iron is removed from the zirconium chloride solution by a secondary solvent extraction system, comprising the steps of removing the iron contaminant from the zirconium chloride solution by flowing regenerated extraction solvent contaminated with tar-forming organic compounds from said main solvent extraction system and said zirconium chloride solution countercurrently through a solvent extraction column of from about ten to fifteen theoretical stages; discharging the iron-free zirconium chloride solution from said column; passing the said contaminated iron-loaded extraction solvent directly to a packed, steam-stripper, distillation column; vaporizing said extraction solvent in said distillation column; resulting in a residual aqueous solution cotaining said iron and contaminated by said tar-forming organic compounds; separately discharging the vaporized extraction solvent and said residual aqueous solution from sais distillation column: and condensing said vaporized extraction solvent and returning it to said main solvent extraction system substantially free of said tar-forming organic compounds.

3. A process in accordance with claim 2, wherein the solvent extraction column is a pulse column.

4. A process in accordance with claim 2, wherein the solvent is MIBK.

5. A process in accordance with claim 2, wherein regenerated solvent from the main solvent extraction system is passed into the solvent extraction column for effecting iron extraction of the zirconium chloride solution.

6. A process in accordance with claim 2, wherein extraction solvent condensate is recycled to the main solvent extraction system for ammonia regeneration.

7. A process in accordance with claim 2, wherein the countercurrent flow of the extraction solvent and the zirconium chloride solution is at a ratio of about 0.1 to about 0.25, respectively.

8. Apparatus for separating aqueous zirconium and hafnium chloride solutions and eliminating iron contaminant from the zirconium chloride solution, comprising a main solvent extraction system for separating zirconium and hafnium chloride solutions; and a secondary solvent extraction system for removing the iron from the zirconium chloride solution, said secondary system comprising a solvent extraction column having from ten to fifteen theoretical stages; means for separately introducing the iron-containing zirconium chloride solution and a regenerated extraction solvent contaminated with tar-forming organic compounds from said main solvent extraction system into said column so they will flow countercurrently to each other within said column and said contaminated extraction solvent will extract the iron from said zirconium chloride solution; means for separately discharging iron-free zirconium chloride solution and said contaminated extraction solvent from said column; a steam-stripper distillation column; means for introducing said contaminated extraction solvent directly into said distillation column; means for introducing steam into said distillation column; means for separately discharging vaporized extraction solvent and residual aqeous solution containing the iron and said tar-forming organic compounds from said distillation column; and means for condensing the vaporized extraction solvent discharged from said distillation column and for returning it to said main solvent extraction system substantially free of said tar-forming organic compounds.

9. Apparatus in accordance with claim 8, wherein the solvent extraction column is a pulse column.

10. Apparatus in accordance with claim 8, including means for introducing into the distillation column water condensed from the condensing means.

* * * * *